US006653804B1

United States Patent
Kureck

(10) Patent No.: US 6,653,804 B1
(45) Date of Patent: Nov. 25, 2003

(54) METHOD AND APPARATUS FOR CONTROLLING A BUCKET HOIST USING A FLUX VECTOR AC DRIVE

(75) Inventor: Aaron S. Kureck, Nashotah, WI (US)

(73) Assignee: MagneTek, Inc., New Berlin, WI (US)

( * ) Notice: Subject to any disclaimer, the term of this patent is extended or adjusted under 35 U.S.C. 154(b) by 0 days.

(21) Appl. No.: 09/968,676

(22) Filed: Oct. 1, 2001

Related U.S. Application Data

(60) Provisional application No. 60/237,021, filed on Sep. 29, 2000.

(51) Int. Cl.$^7$ ................................................ H02K 7/14
(52) U.S. Cl. ........................... 318/3; 318/434; 318/432; 388/903
(58) Field of Search ................................ 318/434, 432, 318/3; 388/903, 917, 815; 414/624

(56) References Cited

U.S. PATENT DOCUMENTS 778,897 A 1/1905 Robb et al.
4,231,698 A 11/1980 Lado
5,235,259 A * 8/1993 Dhindsa et al. ............. 318/434
5,392,935 A 2/1995 Kazama et al.
5,973,463 A * 10/1999 Okuda et al. ............... 318/430
6,023,862 A 2/2000 Sirjola

FOREIGN PATENT DOCUMENTS

JP 1203194 8/1989
JP 4358695 12/1992
WO WO 98/06657 2/1998

* cited by examiner

Primary Examiner—Karen Masih
(74) Attorney, Agent, or Firm—Waddey & Patterson; Mark J. Patterson; Phillip E. Walker

(57) ABSTRACT

A dual hoist bucket crane controller for operating a closing motor and a holding motor using a close inverter adapted to control the closing motor and a hold inverter adapted to control the holding motor where the hold inverter and the close inverter are internally controlled and operate independently from the other drive. Also covered is a dual hoist bucket crane controller for operating a closing motor and a holding motor using a dual axis master switch adapted to provide a close inverter input signal to the close inverter and a hold inverter input signal to the hold inverter.

25 Claims, 7 Drawing Sheets

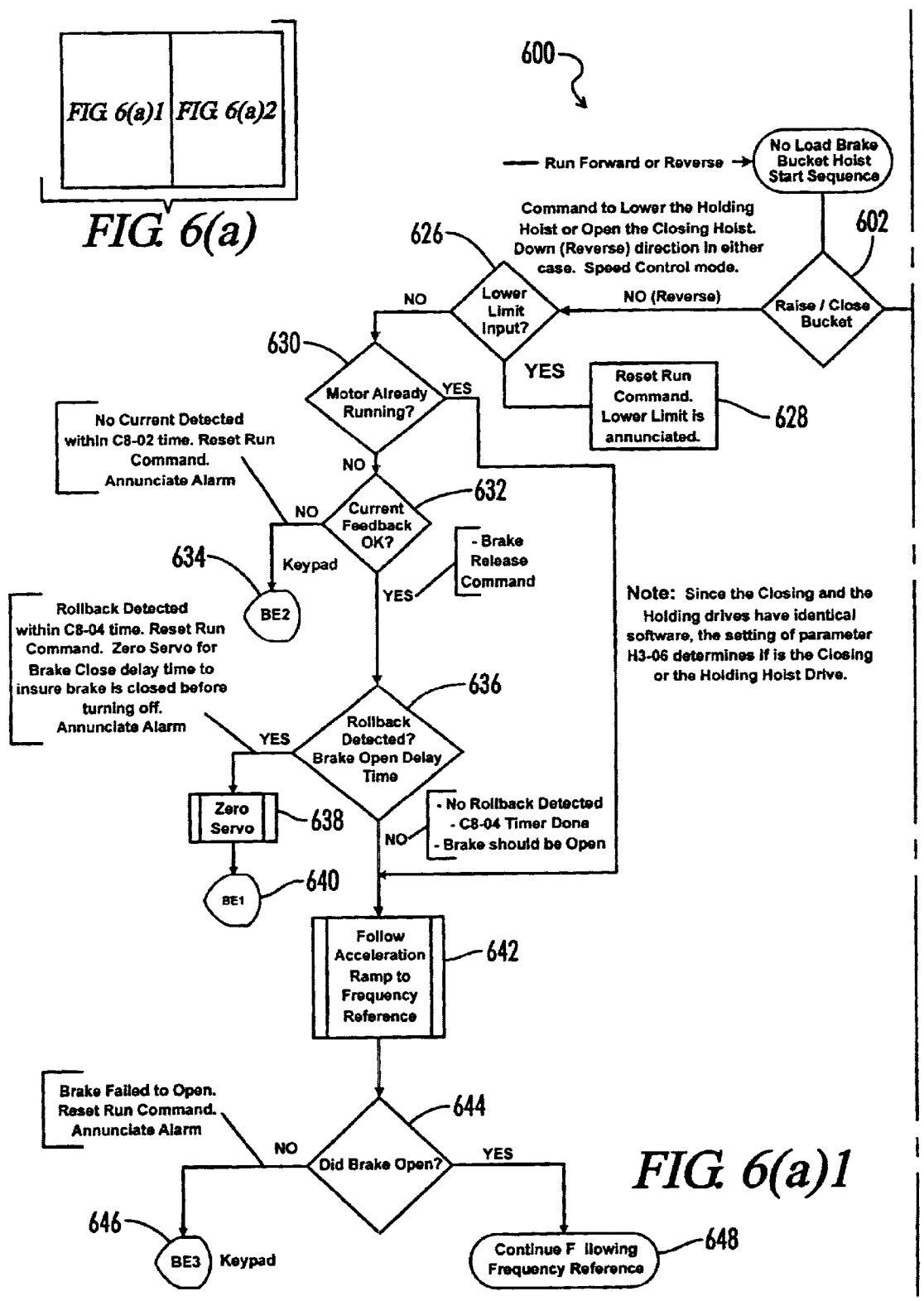
FIG. 6(a)1

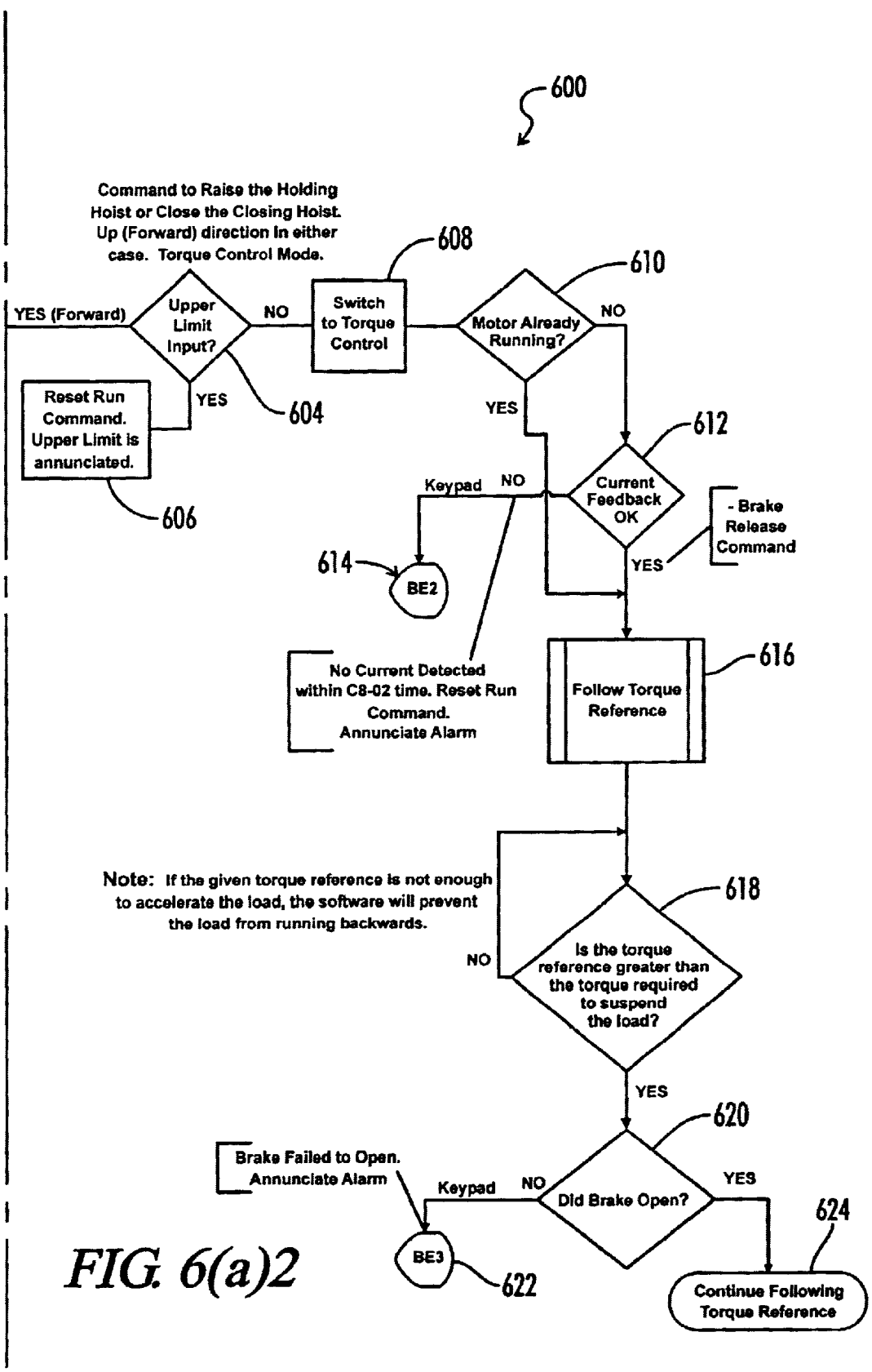
FIG. 6(a)2

METHOD AND APPARATUS FOR CONTROLLING A BUCKET HOIST USING A FLUX VECTOR AC DRIVE

This application claims benefit of co-pending Provisional U.S. patent application Ser. No. 60/237,021 filed Sep. 29, 2000, entitled "Method and Apparatus for Controlling a Bucket Hoist Using a Flux Vector AC Drive."

A portion of the disclosure of this patent document contains material which is subject to copyright protection. The copyright owner has no objection to the facsimile reproduction by anyone of the patent document or the patent disclosure, as it appears as in the Patent and Trademark office patent file or records, but otherwise reserves all copyright rights whatsoever.

BACKGROUND OF THE INVENTION

The present invention pertains to electric powered bucket cranes and hoists. More specifically, the present invention relates to methods and devices for controlling movement of a hoist bucket.

Hoist buckets are used on clam shell and grapple cranes to dig and move material from one location to another. The proper movement of such buckets requires the coordinated movement of two motors: one for raising and lowering the bucket and one for opening and closing the bucket. Proper coordination of the hoist motors is needed for these operations. For example, proper control is necessary so that the bucket will not unexpectedly open when it is being moved up or down due to slack in the hoist lines. To prevent this in the prior art, some designs have used a static stepless control using wound rotor motors. Another technique that has been used is providing the device with a Programmable Logic Controller (PLC) to separately control the speed of each hoist so that the load is shared equally. This solution is undesirable because the machine operators have difficulty operating the unit and it also adds cost and complexity.

Several U.S. Patents are directed to various types of controllers. These include U.S. Pat. No. 778,897, issued to Robb et al. on Jan. 3, 1905; U.S. Pat. No. 4,231,698, issued to Lado on Nov. 4, 1980; U.S. Pat. No. 5,392,935 Kazama et al. Feb. 28, 1995; U.S. Pat. No. 6,023,862 Sirjola Feb. 15, 2000; Japanese Patent No. JP1203194 Keiji Aug. 15, 1989; Japanese Patent No. JP4358695 Masao, et al. Dec. 11, 1992; and WTO Patent No. WO 98/06657 Sirjola Feb. 19, 1998.

U.S. Pat. No. 778,897 issued to Robb on Jan. 3, 1905 discloses a Motor Control for Hoisting Buckets. This patent shows a two cable control systems for hoisting buckets.

U.S. Pat. No. 4,231,698 issued to Lado on Nov. 4, 1980 discloses a system for one-hand control of two winches during hoisting of closed clamshell, with differentiation. This patent discloses the use of two operating control lines for controlling the opening, closing and hoisting of a bucket. This patent notes that the hydraulic winch for the closing line should be the one utilized to lift the bucket and the second line is just to be taken in to control slack. The control of slack in the second line is done by placing the second winch motor in tandem with the first motor such that the exhaust of the hydraulic fluid from the first motor travels through the second motor. The motor valves are then utilized to control the motors separately and control the back pressure from the first motor into the second motor.

U.S. Pat. No. 5,392,935 issued to Kazama et al. on Feb. 28, 1995 discloses a control system for cable crane. This patent discloses the use of an opening and closing gate operated by a hydraulic cylinder and a limit switch for detecting the opening and closing of the gate. This patent does not describe the use of two cable lines in order to control the opening and closing of the clamshell type bucket.

U.S. Pat. No. 6,023,862 issued to Sirjola on Feb. 15, 2000 discloses a control system for a rope bucket. This patent describes the use of a control system which includes a hoist mechanism for hoisting a rope bucket and a close mechanism for closing and opening the scoop of the rope bucket and also for hoisting and lowering the rope bucket. This invention is directed to the elimination of a transfer system and utilizes the same bucket support system for opening and closing of the bucket, lifting and lowering of the bucket, and transfer of the bucket horizontally.

Japanese Patent No. JP1203194 issued to Manabe Keiji on Aug. 15, 1989 discloses a hoist control method for crane provided with rope type bucket. This patent describes the operation of a controller for setting the output frequency of a supporting inverter so that the speed of a hoist and opening closing controlling motor are identical based upon the detected output frequency of the open close inverter during the hoist work.

Japanese Patent No. JP4358695 issued to Yamamoto Masao et al. on Dec. 11, 1992 discloses a clamp control for crane with rope type bucket. This patent describes the use of two motors with two inverter devices with variable voltage and variable frequency. It then describes the controlling of the speed of the D motors by the inverter devices to open the bucket, lower the open bucket and then close the bucket.

World Organization Patent No. WO 98/06657 is an international filing similar to U.S. Pat. No. 6,023,862 issued to Sirjola.

These patents fail to describe the advantages of the present invention described herein.

SUMMARY OF THE INVENTION

The novel control device of the present uses a programmable flux vector inverter to provide load sharing and speed matching control features required for a dual hoist bucket application such as a Clam-Shell or Grapple type crane application. The drive software of the present invention makes it possible to operate the hoist motions on a bucket crane without the need for a Programmable Logic Controller (PLC) or other external logic.

The use of this drive software makes it possible to operate hoist motions on a bucket crane without the need for a PLC or other external logic by utilizing load sharing and speed matching control features within the motor control system. This is done by utilizing speed and torque control modes for operating the motors and providing signals appropriate to the motors to maintain the motors in the same relative position and operating at the same relative speed.

The "hold" and "close" inverter drives are completely independent and do not need to "communicate" with one another such-as in a 'master'/'slave' type arrangement where the master drive always controls the operation of the slave drive. Each hoist motion can be operated individually via a dual axis master switch. If either hoist is lowered/raised individually it will open/close the bucket accordingly. If both hoists are raised simultaneously the bucket will automatically try, to close due to the proportional load sharing. If both hoists are lowered simultaneously the bucket will remain in the operating condition (open or closed) it was in when it started the motion. This is due to the fact that both drives are in speed control mode when lowering. As long as the speed reference signals to both drives are identical the hoist motions will match speed in the lower direction.

BRIEF DESCRIPTION OF THE DRAWINGS

FIGS. 6(a) and 6(b) are flow charts showing the modes of operation of the dual transceivers in accordance with the present invention.

DESCRIPTION OF THE PREFERRED EMBODIMENTS

Figure 1:
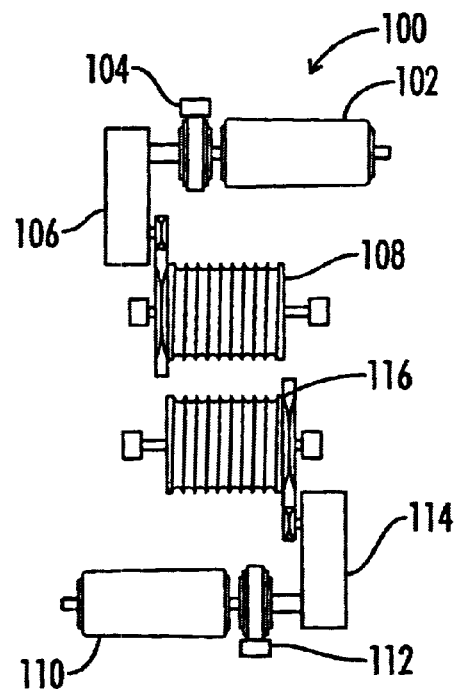
FIG. 1 is a schematic diagram of a typical hoist motor configuration.
Figure 2:
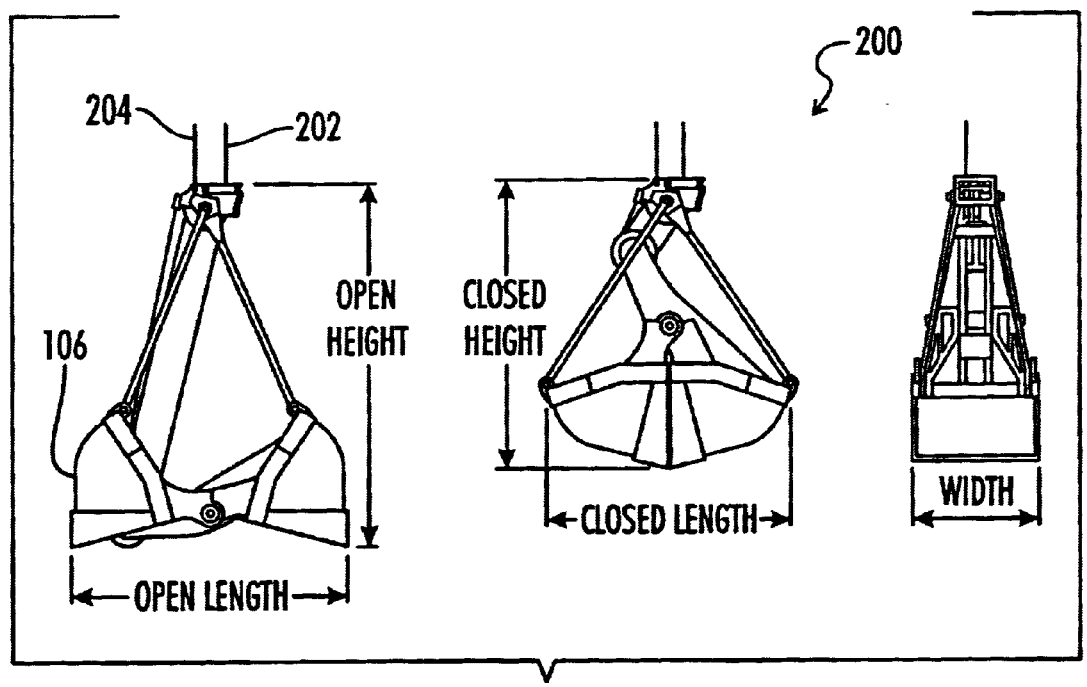
FIG. 2 shows a side view of a bucket in the open position, a side view of a bucket in the closed position, and an end view of the bucket

The device and method of this invention uses a programmable flux vector inverter, such as the IMPULSE (trademark) VG+ Series 2 inverter manufactured by ELECTROMOTIVE SYSTEMS BY MAGNETEK, IiqC. (trademark), operating the method described herein to provide load sharing and speed matching control features required for dual hoist bucket crane applications including Clam-Shell or Grapple type systems as shown in FIGS. 1 and 2. This special drive software makes it possible to operate the hoist motions on a bucket crane without the need for a Programmable Logic Controller (PLC) or other external logic.

Figure 3:
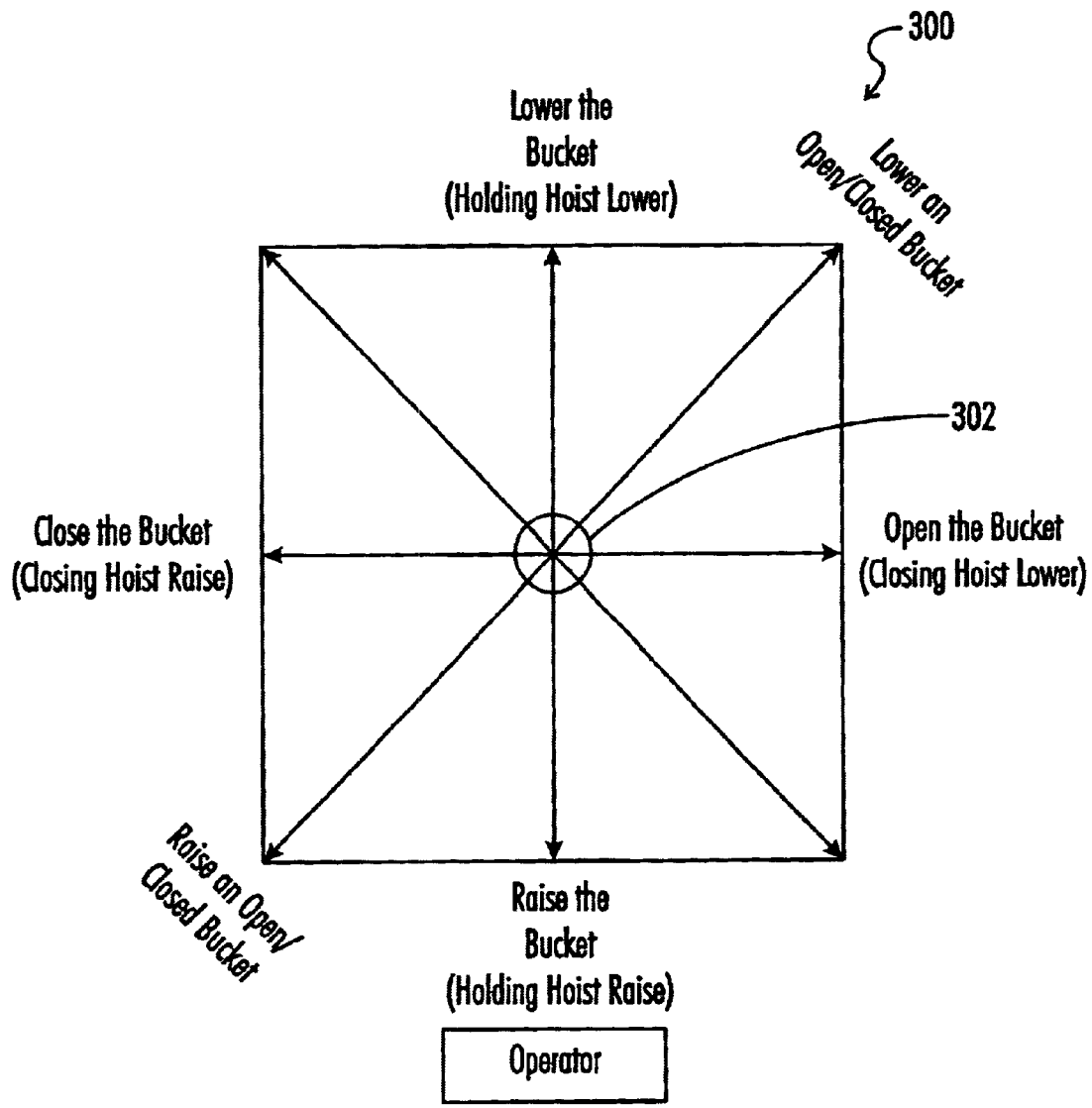
FIG. 3 is a schematic diagram showing the different control positions of a Master Switch that can be used with the present invention.

In the apparatus of the present invention, the "hold" and "close" inverter drives are completely independent and do not need to "communicate" back and forth with one another such as in a 'master'/'slave' type arrangement. Each of the hoist motions can be operated individually via two individual master switches or a dual axis master switch as shown in FIG. 3. If either hoist is lowered or raised individually it will open or close the bucket accordingly. If both hoists are raised simultaneously the bucket will automatically try to close due to the proportional load sharing implemented in this software through the torque control mode. If both hoists are lowered simultaneously the bucket will remain in the operating condition (either open or closed) the bucket was in when it started the motion since both drives are in speed control mode when lowering. As long as the control signals to both drives are identical the hoist motions will match speed in the lower direction.

FIG. 1 of the drawings shows a dual hoist bucket crane controller 100 comprising a closing motor 102 connected through an electric brake 104 to a gear box 106 for operating a closing drum 108 for controlling the closing cable 202 (not shown in FIG. 1). Also shown is a holding motor 110 connected through the electric brake 112 and the gear box 114 to the holding drum 116 for controlling the holding cable 204 (not shown in FIG. 1).

FIG. 2 of the drawings shows how the closing cable 202 and holding cable 204 are used to operate a clam shell type bucket 106. The cables 202, 204 are. received in a standard configuration in order to allow for operation of the clam shell bucket with the closing cable 202 and holding cable 204.

FIG. 3 shows a typical operating control or master switch 300 of the present invention utilizing a single lever 302 to provide multiple operation of the bucket hoist 200. This is a 'joystick' type master switch 300 with a dual axis 0–10VDC reference output. The lever 302 may be moved in both a vertical and horizontal direction to provide the operating positions including: lower the bucket (holding hoist lower) lower an open/closed bucket; open the bucket (closing hoist lower); raise the bucket (holding hoist raise); raise an open/closed bucket, and close the bucket (closing hoist raise).

Figure 4:
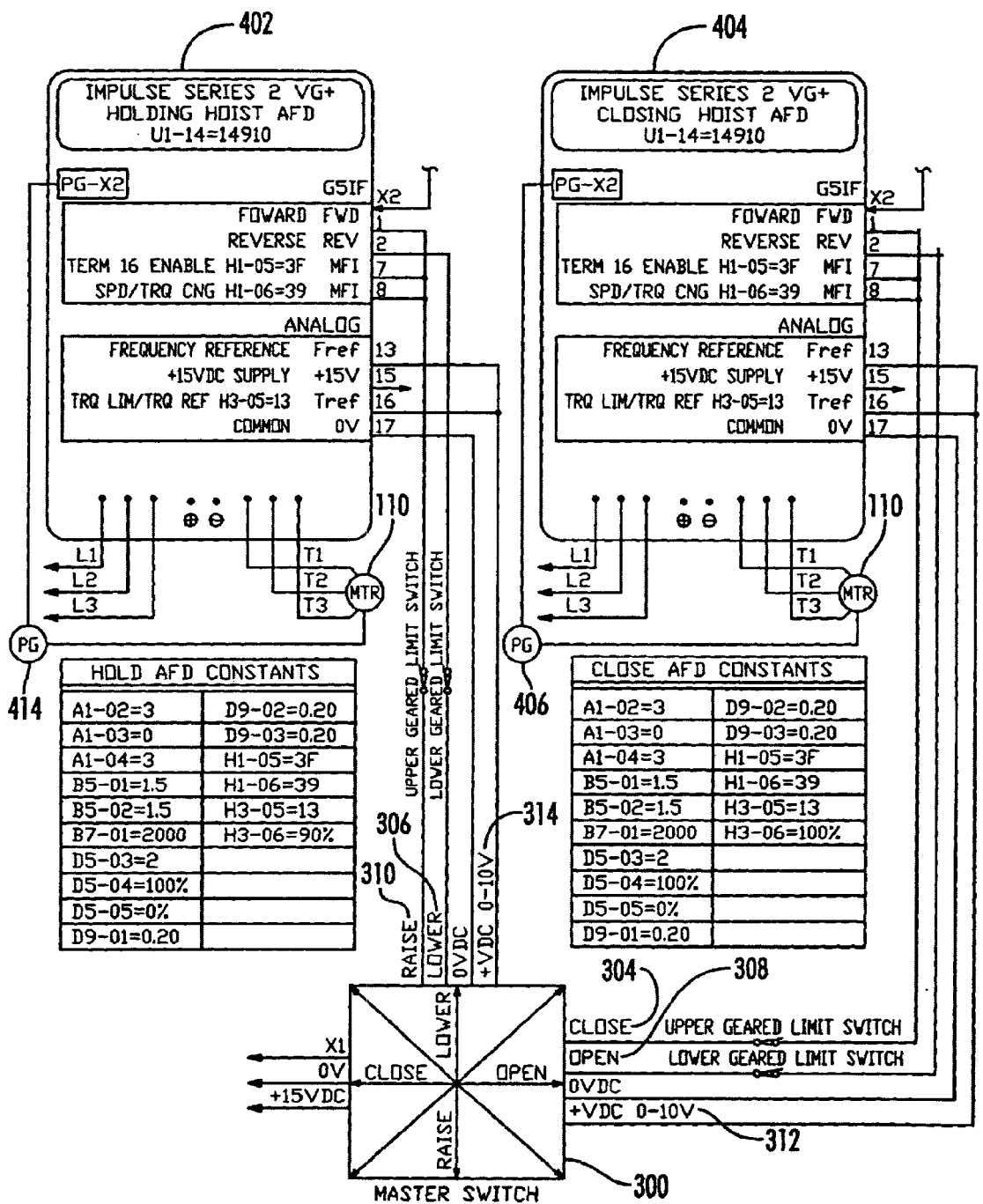
FIG. 4 is a block diagram of one embodiment the hoist control system of this invention.

FIG. 4 shows the connection of this master switch 300 into a first (hold) motor controller (inverter) 402 and second (close) motor controller (inverter) 404. FIG. 4 shows a standard 3 wire connection between the first motor controller 402 and holding motor 110. The holding motor 110 is connected through a pulse generator 414 back into the first motor controller 402 for feedback on the operation of the holding motor 110. The master switch 300 provides four signals to the first motor controller 402 including raise, lower, zero volt DC, and a variable zero to ten volt DC signal. The raise signal passes through an upper geared limit switch and connects to the forward command signal and also provides an enabling signal for the torque reference and the speed and torque control change over. The lower signal passes through the lower geared limit switch and is used to active the reverse operation of the first motor controller 402. The zero volt DC signal is merely a common ground signal for the entire system. Finally, the variable zero to ten volt DC signal is input into the first motor controller 402 as the frequency reference and the torque reference. Also noted in FIG. 4 are the constants for both the hold frequency drive and close frequency drive. The values shown are related to the preferred drive selected for the preferred embodiment. In each of these tables is shown the various parameters which are set for the particular Impulse VG+ Series 2 (trademark) motor controller that were used for the preferred embodiment. For this drive, the A1 series of parameters are used to control initialization parameters. The B5 series of parameters are used to control the acceleration/deceleration applications parameters. The B7 series is used to control the SVR function for the particular application parameters. The D5 parameters are used to control the torque control for tuning of the controller. The D9 series of inputs are used to control the S-curve acceleration/deceleration parameters for tuning, the H1 series parameters are used to control the digital inputs from the terminal and the H3 series parameters are used to accept analog inputs from the terminal. These parameters are particular for this drive and will change with the type of drive that is used. These parameters are included to indicate that typical drive parameters are utilized to control the limits of the drive system. Similar connections are then made from the master switch 300 to the second motor controller 404 with the close, open, zero volt DC and variable zero to ten volt DC signals. Note: The limit switches in this example are shown in series with the run commands. They may, instead, be run directly into a separate input on the inverter and used for internal logic.

The operation of the device and method can be understood through the following description of the control. This description begins at an initial position with the bucket in a fully open position after a dump. To lower an open bucket, the operator must move the master switch into the lower/open corner as shown in FIG. 3. This position will lower both hoists at an equal speed and the bucket will remain open. To perform the digging function the operator will close the bucket on the pile of material to be moved. To close the bucket, the operator will move the master switch in the close direction. This will raise the closing hoist. Once the bucket is fully closed, it will begin to lift out of the pit. The operator should then move the master switch into the close/raise corner to begin raising the holding line also. Note: In the present software, the closing hoist will slow down until the holding hoist catches up and they begin to share the load. An experienced operator will grasp this concept quickly. To raise a closed bucket (loaded or unloaded), the operator must move the master switch into the close/raise corner. This will raise both the closing and the holding hoists at an equal reference. In order to keep a full bucket closed while raising it out of the pile, the torque must be proportionally shared between the two hoists. This means that the load sharing must be a minimum of 50% between the "hold" and "close" motions. The Closing hoist will always have a slightly greater torque reference in order to ensure the bucket remains closed during the lift. The load sharing is handled in the inverter software. It is important that the operator gives equal reference to both hoists while raising a loaded bucket. Most operators give full reference up/down even though in between speeds can be accomplished. If it is important that occasionally an operator must be able to raise a closed bucket at speeds less than the maximum, a master switch with stepped movement is recommended. This will allow the operator to confidently give an equal reference to each inverter.

To stop the hoisting motion, return the master switch to the center position (spring return master switches are recommended). Both hoists will decelerate to a complete stop before setting the electric brake. The bucket will remain in the position it was in prior to stopping. To keep the bucket fully closed in the lower direction, the speed of the hoist cables must be matched.

Figure 5:
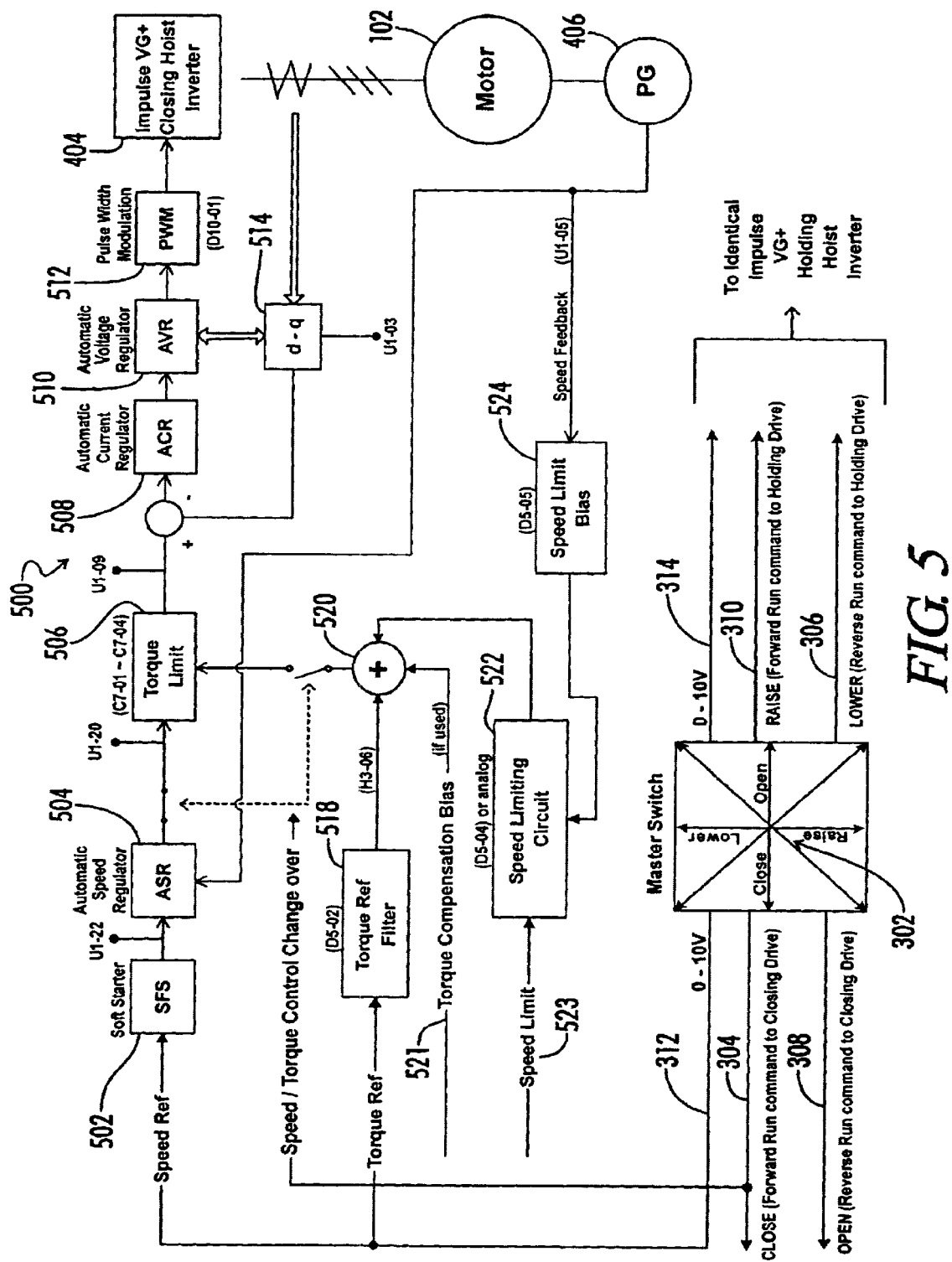
FIG. 5 is a more detailed block diagram of one embodiment of the present invention.
Figure 6B:
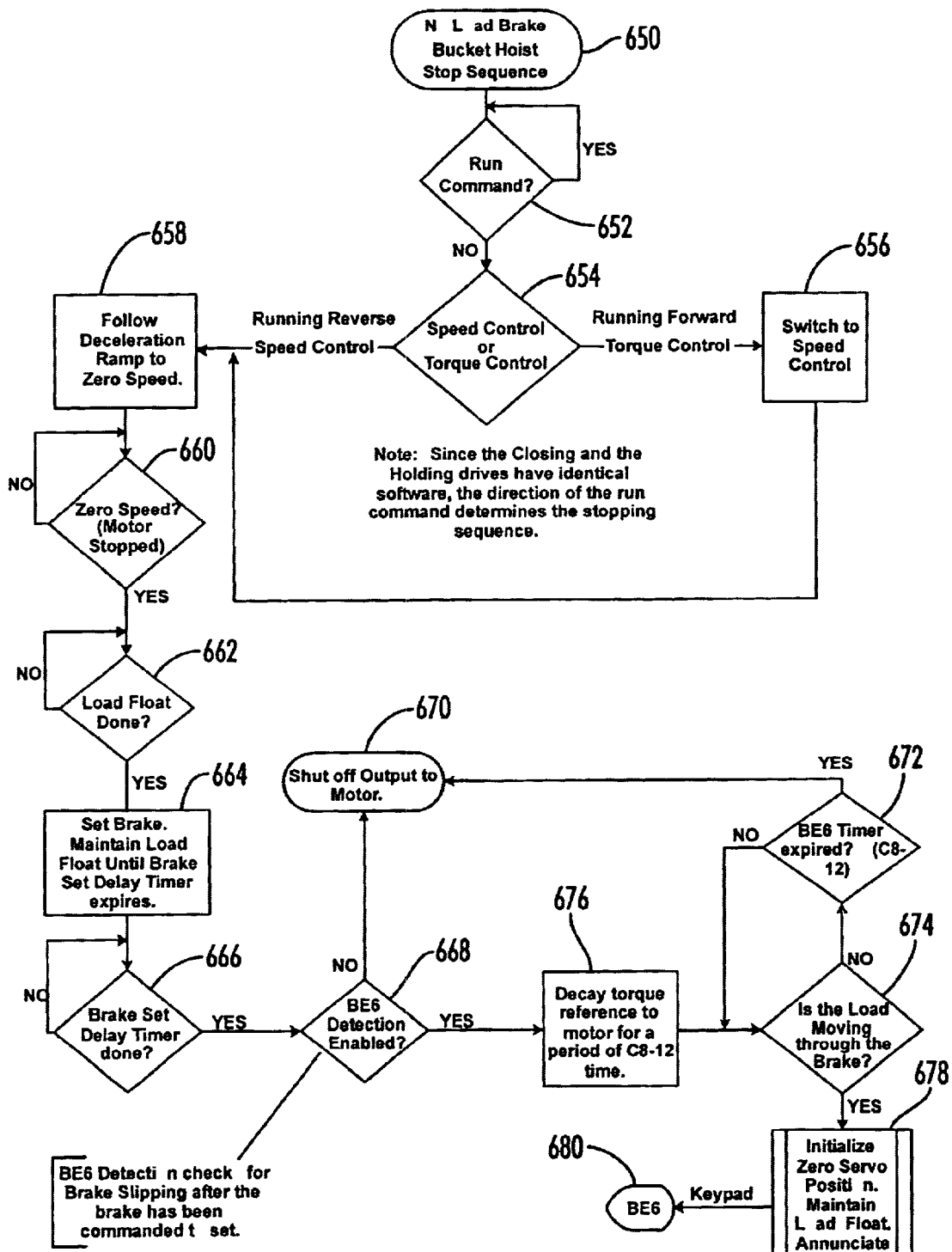

Looking at the schematic diagram of FIG. 5, the block diagram of FIG. 5 and the flow charts of FIGS. 6(*a*) and 6(*b*), the apparatus operation and method may be understood. FIG. 5 shows a schematic operating diagram of the inverter control 500 and how the signals from the master switch 300 are used in the inverters 402, 404 to control the motors 102, 110. The master switch 300 provides a close command 304, raise command 310, open command 308, and lower command 306 with a closing hoist inverter 0–10 volt variable output 312 and a holding hoist inverter 0–10 volt variable output 314. Because the operation of the two inverters 402, 404 are similar, this following detail will describe only the operation of the second (closing) inverter 404.

The variable output 312 is utilized first as a speed reference and also as a torque reference for the inverter control 500.

The speed reference use of the variable output 312 is utilized through a soft starter 502 and the output of the soft starter is monitored by the inverter control 500. The output of the soft starter 502 is provided to an automatic speed regulator 504. The automatic speed regulator 504 uses the output of the soft starter 502 and the pulse signal from the pulse generator 406 connected to the motor 102 to generate the primary frequency in hertz. The availability of the primary frequency to the torque limit controller 506 is controlled by the speed/torque control change over switch 505 connected between the automatic speed regulator 504 and the torque limit controller 506.

The torque limit controller 506 uses either the output of the automatic speed regulator 504 or the combined torque limit input from the torque combination control 520 to provide a torque reference. The torque reference is then adjusted by the d-q, (d=flux generating current, q=torque generating current) to provide an AVR input to the automatic current regulator 508 which provides an input to the automatic voltage regulator (AVR) 510. The automatic voltage regulator 510 uses the AVR input and the (d-q output) to provide the regulated signal as an input to the pulse width modulator 512 to provide a signal to the closing hoist inverter 404 which powers the closing motor 102 connected to the pulse generator 406.

The pulse generator 406 is connected back to the automatic speed regulator 504 as previously described and is also connected to provide a motor speed signal to a speed limit bias controller 524. The speed limit bias controller 524 is connected into the speed limiting circuit which also uses the input speed limit 523 to provide the output for the torque combination control 520.

The basic flowchart operation of the system is shown in FIGS. 6(*a*) and 6(*b*).

As shown in FIG. 6(*a*) the run forward or reverse command initiates the no-load-brake bucket-hoist start-sequence 600. This sequence 600 will check 602 to see n whether this command requests the bucket to be raised or closed.

If the command is to raise the holding hoist or close the closing hoist then it directs the up or forward direction in either case. This means that the inverter will be operated in torque control mode. The no-load-brake bucket-hoist start-sequence 600 will then check 604 to see if the upper limit input has been reached. If the upper limit input has been reached, then the system will reset the run command and the upper limit is annunciated on the keypad 606. If the upper limit has not been reached, then the system will switch 608 to torque control mode and check 610 to see if the motor is already running. If the motor is not already running then the system will check 612 the current feedback to make sure current is flowing within a specified time provided as an input current feedback ok timer. If the current has not reached a predefined level within this time period, then the system will annunciate 614 a no current detected alarm on the keypad and reset the run command. If the current feedback is ok or if the motor is already running, then the system will follow the torque reference 616.

Once the system begins to follow the torque reference 616, the system will check to see if the supplied torque reference is greater than the torque required to suspend the load 618. If the given torque reference is not enough to accelerate the load, the software will prevent the load from running backwards and continue to check to see if the torque reference is greater than the torque required to suspend the load 618. If the torque reference is greater than that required to suspend the load, the system will check to see if the brake is opened 620. If the brake is not opened then the system will annunciate an alarm that the brake failed to open 622. If the brake successfully opened, then the system will continue to follow the torque reference 624.

Returning to the initial start of the flowchart sequence of FIG. 6(*a*), if the run command is not a raise/close bucket command, then the run command is commanding to lower the holding hoist or open the closing hoist. In either case, this is a down (or reverse) direction and the system will operate in speed control mode. The system will first check to see if the lower limit input has been reached 626. If the lower limit input has been reached then the system will reset the run command and annunciate the lower limit on the keypad 628. If the lower limit has not been reached, then the system will check to see if the motor is already running 630. If the motor is already running then the system will immediately move to follow the acceleration ramp for the frequency response 642. Otherwise, if the motor is not already running then the system will check for current feedback 632.

If the current feedback is not detected within the allowed time period, then the system annunciate an alarm 634. If the current feedback is detected within the allowed time period, then the system will send the brake release command and check to see if a rollback is detected for the brake open delay time 636. If the rollback is detected then the system will reset the run command, maintain the load 638 for the brake close delay time to insure that the brake is closed before turning off the drive and sound an alarm 640. If the rollback is not detected within the detection time then the brake should be open and the system will follow the acceleration ramp to the commanded frequency reference 642. After the system begins following the acceleration ramp to the commanded frequency reference then the system will check to see if the brake opened 644. If the brake did not open then the system will reset the run command and annunciate an alarm 646. If the brake did open then the system continue following the frequency reference 648.

FIG. 6(*b*) of the drawings shows the no load brake bucket hoist stop sequence 650. The sequence first checks to see if the run command has ended 652. If the run command is still a valid command then the system will continue to check for the end of the run command 652. Once the run command has ended the system will check to see if the drive is in speed control mode or torque control mode 654. If the drive is running forward then the system is in torque control mode and the system will switch to speed control mode 656. After switching to a speed control mode 656 the system will move to follow the deceleration ramp to zero speed 658. If the system is already in speed control mode and running in reverse then the system will move immediately to follow the deceleration ramp to zero speed 658. Note: Since the closing and holding drive have identical software, the direction of the motor rotation determines the stopping sequence.

After following the deceleration ramp to zero speed 658 the system will check to make sure that zero speed has been achieved 660. If it has not been achieved then the system will continue to monitor 660 until zero speed has been achieved. Once zero speed has been achieved 660 then the system will check to make sure that the load float has been completed 662. If the load float has not been completed then the system will continue to wait and check until this has occurred. Once the load float has been completed at 662 the system will set the brake and maintain the load float until the brake set delay timer expires 664. The system will check 666 to make sure that the brakes set delay timer has completed and if not will continue to wait and check until the brake set delay timer is completed 666. The system will then double check to make sure that the brake slipping detection has been enabled 668. The brake slipping detection checks for the brake slipping after the brake has been commanded to set. If the brake slipping detection has been enabled then the system will shut off the output to the motor 670. If the brake slipping detection has not been set then the system will decay the torque reference to the motor for a period of time 676. The system will then check to see if the load is moving through the brake 674. If the load is not moving through the brake then the system will check to see if the brake slipping timer has expired 672. If the brake slipping timer has expired then the system will move to shut off the output to the motor 670. If the brake slipping timer has not expired then the system will check to see if a load is moving through the brake 674. If a load is moving through the brake then the system will initialize the zero servo position, maintain the load float, and annunciate the brake slipping alarm 678. The brake slipping alarm will then be shown on the display of the keypad 680.

Finally, the following application notes provides insight into the installation and some observations regarding this type of application.

The severe duty cycle requirements of most bucket crane applications require hoist motor sizing greater than 50% of the bucket full load for each of the hold and close motor. Therefore, it is recommended that each hoist motor be sized at a minimum of 60% to 75% of the bucket full load. This will help to ensure that the crane is responsive and doesn't become overly sluggish during digging and hoisting operations.

To setup and startup the operation of the hoists and controllers, the following should be performed.

First, de-couple the motor shafts from the gearbox and tune both the hoist drives to their respective motors. After the hoist drives have been tuned to their drives, then re-couple the motor shafts. The tuning of drives to motors will vary with the individual motors and drives utilized.

Second, the user should verify the drive programming. For the current drives, the A1-03 Motion parameter should be programmed with data 3 to indicate that this is a Bucket Hoist. The A1-04 Speed Reference parameter should be programmed with data 3 to indicate that a Uni-Polar signal is being used to indicate the amount or magnitude of the raise or lower commands. All other multi-function inputs/outputs, such as limit switches, should also be programmed to perform their desired functions as applicable to the desired drive type.

Third, the user should verify the proper operation of the master switch 300 as shown in FIG. 3. The user should verify that when the master switch 300 is placed in the raising position that the reference is proportional to the deflection of the stick 302 and that proper drive operation is performed. The user will then also verify that when lowering, the master switch reference is proportional to the deflection of the stick and the proper drive operation is achieved. Note: the input levels to the controllers (U1-15 and U1-17—Terminals 13 and 16 respectively) should have an equal reference from the master switch.

Fourth, the user should verify that the electric brake is functioning properly and no brake alarms occur when a run command is given.

Fifth, the user should reeve the hoists.

Sixth, the user should set the slow down and end of travel limit switch trip points and verify they are working correctly with an empty bucket. Note: not all hoists use slow down limits so check the particular type of drive being utilized.

Finally, the user should perform a load test for fine tuning and adjustments of the drives. These adjustments include:

Setting the Speed Limit Value (D5-04). This sets the percentage of the Max Frequency (E1-04) the drive can output when the master switch 300 is given 100% reference in the raise direction. The default value is 100%. Note: This is the fastest speed that can be reached in the raise direction. This speed may not be reached if there is not enough torque available to accelerate the motor to this speed. See Raise Motor Torque Gain (H3-06) for further explanation.

Setting the Max Frequency (E1-04) Sets the maximum frequency the drive will output when the master switch is giving a 100% reference. The default is 60 Hz.

Setting the Down Speed Percentage Gain (H3-02). This sets the percentage of the Max Frequency (E1-04) the drive will output when the master switch is given 100% reference in the down direction. The default value is 100%. The drive speed will be proportional to master switch reference.

Setting the Raise Motor Torque Gain (H3-06). This sets the percentage of motor torque the drive will output in the raise direction. The default value is 100%. This is input as a +0V to +10V signal where a 10V input from the master switch limits the torque to 100% of the motor's rated torque.

Note also that several design parameters should be considered when setting up the hoists.

First, the speed in the raise direction is limited only by either the Speed Limit Value (D5-04) or the amount of torque required to accelerate to the speed limit. For example, raising an empty bucket should not require 100% of the available torque and the drive will accelerate to the speed limit as fast as it can within its torque limit set by the Raise Motor Torque Gain (H3-06). For this example, if Raise Motor Torque Gain (H3-06)=50%, the bucket is full, and the operator is giving 100% reference to the drive from the master switch, the output frequency may never reach 100% (default at 60 Hz) because the torque is being limited to 50%. Thus, for this example, these programmed limits on the system do not allow enough torque to accelerate the load any faster.

Second, after the digging operation when the bucket is fully loaded, the closing hoist should not be able to reach the speed limit. If it does, or the holding lines seem too slow to "catch up", then the torque limit/torque reference (H3-05) should be lowered so that the close line will slow down. This will allow the holding lines to "catch up" and begin sharing the load. The closing line will then be able to speed up FIT once holding line starts to help lift the bucket.

Third, the Holding line drive should be programmed for approximately 5–10% less torque than the closing line. This allows the closing line to apply slightly more torque and assure that the bucket remains closed. If it does not, lower the Raise Motor Torque Gain (H3-06) by a factor greater than 5% less than the closing hoist.

Also, some additional consideration should be given to the software design. For the preferred embodiment, the acceleration times are ignored in the raise direction. The drive will accelerate the motor to it's programmed speed limit as fast as it can within its given torque reference. The first acceleration time (B5-01) is used for the lowering acceleration time. There is no change in Deceleration times. Also, the stopping sequence for this drive in this application may be understood by reviewing the No Load Brake Start/Stop in Chapter 5 of the Impulse VG+ manual. The stopping Sequence is identical. The starting sequence is also identical with the exception of NO BE1 or BE2 detection in the raise direction. Additionally, most of the special drive features for this type of drive work as explained in the Impulse VG+ manual with the exception of a few. The following will not work in the raise direction when A1-03=3 (Bucket Hoist): Jump Frequencies; Reverse Plug Simulation (Not necessary to use); Micro-Positioning Control in the raise direction uses the Speed Limit Value (D5-04) rather than freq; Load Check (Will not work in either direction; Ultra Lift (Lower direction only); and Weight Measurement (Will not work in either direction).

Thus, although there have been described particular embodiments of the present invention of a new and useful Method and Apparatus for Controlling a Bucket In Hoist Using a Flux Vector AC Drive, it is not intended that such references be construed as limitations upon the scope of this invention except as set forth in the following claims.

What is claimed is:

1. A controller for operating a bucket closing motor and bucket holding motor in a dual hoist bucket crane, the controller comprising:

a bucket closing motor inverter operative to control the bucket closing motor;

a bucket holding motor inverter operative to control the bucket holding motor;

a master switch operative to provide a closing motor inverter input signal to the bucket closing motor inverter and a holding motor inverter input signal to the bucket holding motor inverter;

the bucket closing motor inverter is responsive to the closing motor inverter input signal from the master switch to provide speed and torque reference signals to control the bucket closing motor independently of the bucket holding motor inverter; and the bucket holding motor inverter is responsive to the holding motor input signal from the master switch to provide speed and torque reference signals to control the bucket holding motor independently of the bucket closing motor inverter.

2. A method of using a master switch to control a closing line and a holding line for operating a bucket in a dual hoist crane with an associated bucket load, the closing line operated by a closing motor and a closing motor inverter and the holding line operated by a holding motor and holding motor inverter, the holding motor inverter and closing motor inverter responsive to signals generated by movement of the master switch, the method comprising:

moving the master switch into a lower/open position to cause the closing motor inverter and holding motor inverter to command the closing motor and holding motor to lower both the closing line and the holding line at matched closing line speed and holding line speeds to lower the bucket;

moving the master switch into a close position to raise the closing line and close the bucket;

moving the master switch into a close/raise position to raise both the closing line and the holding line to raise the closed bucket lowering the closing line speed until the holding line begins to share the bucket load;

proportionally sharing the load between the holding line and the closing line while maintaining a proportionally greater torque reference on the closing line to ensure that the bucket remains closed while the bucket is raised; and moving the master switch into an open position to lower the closing hoist and open the bucket.

3. The method of claim 2, further comprising:

placing the master switch in a center position to stop movement of the holding and closing lines.

4. A method for operating at least two inverters adapted to provide motor outputs to control motors for moving a bucket in a multiple line hoist crane carrying a load, the method comprising:

programming each inverter to independently control one of the motors;

independently controlling each the inverters when raising the bucket to control torque output of each of the motors to provide sharing of the load; and independently controlling each of the inverters when lowering the bucket to control provide speed matching of the motors.

5. A controller adapted to control a closing motor connected with a closing brake for controlling a closing cable in a dual hoist bucket crane and a holding motor connected with a holding brake for controlling a holding cable, the controller comprising:

a first motor controller connected to the closing motor, a second motor controller connected to the holding motor, and a master switch connected to the first motor controller and to the second motor controller, the master switch operative to provide separate run commands and speed and torque reference signals to each of the first and second motor controllers, the first and second motor controllers being independently responsive to their respective run commands and speed and torque reference signals to cause the closing motor and holding motor to move the closing cable and the holding cable.

6. The controller of claim 5 wherein the run command and speed and torque reference signals define operating signals that are associated with an operating position selected from an operating position group, the operating position group including positions for lowering a bucket connected to the holding and closing cables, raising the bucket, opening the bucket, closing the bucket, raising an open/closed bucket, and lowering an open/closed bucket.

7. A hoist operation apparatus for controlling a bucket attached to a bucket hoist comprising:
 a bucket closing motor operably connected to a bucket closing line;
 a bucket holding motor operably connected to a bucket holding line;
 a master switch operable to convert physical input into a close bucket command signal, an open bucket command signal, a close bucket variable signal, a raise bucket command signal, a lower bucket command signal, and a hold bucket variable signal;
 a holding hoist inverter electrically connected to the master switch, the holding hoist inverter responsive to each of the close command, the open command, and the close variable signals to control the bucket holding motor for positioning the bucket holding line; and
 a closing hoist inverter electrically connected to the master switch, the closing hoist inverter responsive to each of the raise command, the lower command, and the hold variable signal to control bucket closing motor for positioning the bucket closing line.

8. The apparatus of claim 7, each inverter including a speed/torque control change over switch connected to an automatic speed regulator and a torque limit controller, the switch adapted to switch between speed control and torque control by connecting to either the automatic speed regulator or the torque limit controller.

9. In a multiple hoist line bucket crane having at least two bucket motors controlled by separate bucket motor inverters, a method for controlling an individual one of the inverters, comprising:
 receiving an input command at the inverter;
 determining if the input command is a raise command or a lower command; and
 alternatively operating the inverter in either a torque control mode if the input command is a raise command or a speed control mode if the input command is a lower command.

10. A method for controlling an individual inverter in a torque control mode for controlling a hoist motor in a multiple-hoist-line crane having a bucket supporting a load, the method comprising:
 checking for an upper limit input to the inverter indicating an upper end of travel condition for the crane bucket;
 checking for proper operation of the hoist motor by sensing if either the hoist motor is running or sensing current feedback from the hoist motor; and
 following an input torque reference signal to control torque in the hoist motor.

11. The method of claim 10, further comprising:
 stopping the hoist motor when the upper limit input is present.

12. The method of claim 10, further comprising:
 stopping the hoist motor if proper hoist motor operation is not detected.

13. The method of claim 10, further comprising:
 sending a brake release command when proper hoist motor operation is detected.

14. The method of claim 10, wherein following the input torque reference signal comprises:
 checking if the input torque reference signal represents a torque that is greater than the torque required to suspend the load.

15. The method of claim 14, wherein following the input torque reference signal further comprises:
 alternatively preventing the load from running backwards if the input torque reference signal does not represent a torque that can suspend the load, or following the torque reference signal if the torque reference signal represents a torque that is greater than that required to suspend the load.

16. The method of claim 10, wherein following the input torque reference signal comprises checking if a crane brake is open and alternatively either annunciating an alarm or continuing to following the torque reference signal.

17. A method for controlling an individual inverter in a speed control mode for controlling a motor in a multiple-hoist-line crane, the method comprising:
 checking for the presence of a lower limit input at the inverter;
 checking for proper motor operation by checking if the motor is already running and/or checking for current feedback; and
 following an acceleration ramp for a frequency reference supplied to the inverter.

18. The method of 17, wherein checking for the presence of the lower limit input, further comprises:
 resetting a motor run command and annunciating the lower limit.

19. The method of 17, wherein checking for current feedback comprises:
 annunciating an alarm if the current feedback is not detected within an allowed time period.

20. The method of 19, wherein checking for current feedback comprises:
 sending a brake release command to a crane brake if the current feedback is detected within the allowed time period; and
 checking for sufficient torque to suspend the load.

21. The method of 20, wherein checking for sufficient torque to suspend the load comprises:
 closing the crane brake;
 annunciating a rollback; and
 suspending the load in position until the brake has been closed.

22. The method of 17, wherein following the acceleration ramp for the frequency reference comprises:
 checking if the brake opened using a feedback signal from the brake; and
 stopping the motor and annunciating an alarm if the brake did not open.

23. A method for controlling an individual inverter to stop a motor on a multiple-hoist-line crane supporting a load, comprising:

detecting an end-of-run stop command;
sensing if the inverter is in a speed control mode or a torque control mode and switching the inverter to speed control mode if the inverter is in torque control mode; and
following a deceleration ramp to zero motor speed to stop the motor.

24. The method of 23, further comprising:
checking that zero motor speed has been achieved
floating the load; and
setting a crane brake.

25. The method of 24, further comprising:
enabling brake slipping detection;
decaying a torque reference signal to the motor for a period of time;
sensing if the load is moving through the crane brake during the period of time; and
either maintaining the load float if the load is moving through the brake or shutting off inverter output to the motor if the load is not moving through the brake.

* * * * *